Patented May 21, 1946

2,400,806

UNITED STATES PATENT OFFICE 2,400,806

EXPLOSIVE SYNTHETIC RESIN

Herman A. Bruson and George B. Butler, Philadelphia, Pa., assignors to Rohm & Haas Company, Philadelphia, Pa., a corporation of Delaware No Drawing. Application January 21, 1944, Serial No. 519,194

10 Claims. (Cl. 260—67)

This invention relates to explosive or readily combustible resins and deals more particularly with synthetic resins derived from 2,4,6-trinitrotoluene ("TNT").

According to this invention, 2,4,6-trinitrotoluene is condensed with formaldehyde and ammonia or a primary amine capable of forming a methylol derivative to yield highly nitrated resins or balsams. These new products, in contrast to TNT itself, burn with great vigor in the air. They are useful for the preparation of military explosives, for charges for rockets, fuses, flares, and the like, or for combustible resinous binders for gun-cotton, black powder, TNT, picric acid, tetryl, nitroglycerine, and other explosive compositions.

Any primary amine may be used which reacts with formaldehyde to form an N-methylol derivative. These amines are accordingly best described as "N-methylol-forming" amines. The effective amines are further characterized in that they are strongly basic. The primary amines which are useful in this invention are the non-aromatic primary amines, that is, primary amines in which the amine nitrogen atom is not joined directly to a carbon atom in the aryl ring, and are primarily aliphatic and alicyclic amines. The N-methylol-forming amines include, for example, methylamine, ethylamine, n-propylamine, isopropylamine, n-butylamine, isobutylamine, the various isomeric amylamines, cyclohexylamine, allylamine, methallylamine, ethanolamine, propanolamine, isobutanolamine, ethylene diamine, diethylene triamine, triethylene tetramine, propylene diamine, N,N'-aminoethyl propylene diamine, and homologues thereof. For most purposes, it is desirable that the amine contain not more than six carbon atoms, but higher amines such as octylamine, dodecylamine, benzylamine, octadecylamine, and the like are useful for special compositions having a slow burning rate. Individual amines may be used or mixtures of amines or mixtures of primary, N-methylol-forming, non-aromatic amines and ammonia.

The formaldehyde may be in the form of an aqueous solution, such as the 30%–40% solutions of commerce, or it may be in the form of paraformaldehyde.

In general, TNT readily condenses with formaldehyde and ammonia or a non-aromatic primary amine on warming the mixture at 50°–90° C., but it also condenses, although more slowly, at room temperature. It is advantageous to carry out the condensation in the presence of a mutual solvent for the reactants. For this purpose, dioxane or ethanol is particularly useful. In order to control the reaction, it is advantageous to dissolve or suspend the TNT in the inert solvent, add formalin or paraformaldehyde thereto, and then gradually add the ammonia or the primary amine to the stirred reaction mixture while the vigor of the reaction is controlled, as by cooling, if necessary. After the exothermal reaction has ceased, the condensation can be completed by warming the reaction mixture to about 95° C., preferably with the addition of more formaldehyde to react completely with any free amino groups still present.

It is advantageous in the case of ammonia to employ one mol of TNT for each mol of ammonia. In the case of primary methylol-forming amines, either one or two mols of TNT can be used for each $NH_2$ group. Any free —NH— groups formed may be bound with formaldehyde. The proportions used can, however, be varied considerably in order to obtain resins of different physical properties.

The following examples illustrate this invention.

Example 1

To a suspension of 11.5 grams of TNT (0.05 mol) in 50 cc. of ethanol containing 4.5 grams of aqueous 37% formaldehyde (0.05 mol), there was gradually added 5.7 grams of 15% ammonium hydroxide solution (0.05 mol) while the reaction mixture was stirred and the temperature was maintained below 30° C. The reaction mixture was then boiled under reflux for one hour. Aqueous 37% formaldehyde (nine grams, or 0.1 mol) was thereupon added and refluxing continued for an additional hour. After the reaction mixture was cooled, the resin which separated was removed, dissolved in acetone, filtered, and the clear acetone solution carefully evaporated to dryness in vacuo.

The product obtained is a coal-black hard resin which softens at about 95°–100° C. It can be molded into blocks. It burns with great vigor in the air in contrast to TNT itself.

Example 2

To a suspension of 11.5 grams of TNT (0.05 mol) in 25 cc. of ethanol, there was gradually added a solution of 1.6 grams of ethylene diamine (0.05 mol) in 25 cc. of ethanol while the reaction mixture was stirred and cooled below 30° C. Aqueous 37% formaldehyde solution (4.5 grams, or 0.05 mol) was then added and the reaction mixture boiled for one hour under reflux on a steam bath. Additional formaldehyde (4.5 grams of 37% solution) was added and refluxing continued for another hour. The resin which formed was separated, dissolved in acetone, and filtered. This acetone solution was carefully evaporated to dryness in vacuo. The product was a black, hard combustible resin which softened at about 120° C.

Example 3

Eleven and one-half grams (0.05 mol) of TNT was suspended in 50 cc. of cold ethanol, and 4.5 grams (0.05 mol) of 37% aqueous formaldehyde and 4.5 grams of 35% aqueous methylamine were gradually added while the temperature was kept below 30° C. The reaction mixture was then refluxed on the steam bath for one hour. At the end of this time, 4.5 grams (0.05 mol) of additional 37% aqueous formaldehyde was added and refluxing continued for another hour. The resin was dissolved in acetone, the acetone solution combined with the ethanol solution, and the whole evaporated to dryness under reduced pressure with steam heat. A black, brittle resin remained, weighing twelve grams and having a melting point of about 125° C.

Example 4

Eleven and one-half grams (0.05 mol) of TNT was suspended in 50 cc. of ethanol, and 4.5 grams (0.05 mol) of 37% formaldehyde was added. A solution of 3.1 grams (0.05 mol) of ethanolamine in 25 cc. of ethanol was then added while the temperature was maintained below 35° C. The reaction mixture was then heated on the steam bath for one hour. An additional 4.5 grams of 37% aqueous formaldehyde was added and refluxing continued for another hour. The solvent was then evaporated under vacuum, leaving thirteen grams of a hard, black resin which melts at 105°-110° C.

Example 5

Eleven and one-half grams (0.05 mol) of TNT was suspended in 50 cc. of ethanol and 4.5 grams (0.05 mol) of 37% formaldehyde added. Three grams (0.05 mol) of allylamine was then added while the temperature was held below 30° C. The reaction mixture was then refluxed on the steam bath for one hour. An additional 4.5 grams of 37% aqueous formaldehyde was added and refluxing continued for another hour. The resin was dissolved in acetone, the resulting solution combined with the ethanol solution, and the solvent evaporated under vacuum on a steam bath, leaving sixteen grams of a soft, black resin. A sample was heated overnight at 100° C. with a small amount of benzoyl peroxide. It polymerized to a hard resin which melts at about 95°-100° C.

Example 6

Eleven and one-half grams (0.05 mol) of TNT was suspended in 50 cc. of ethanol and 4.5 grams of 37% formaldehyde added. Five grams (0.05 mol) of cyclohexylamine was then added through a dropping funnel while the temperature was maintained below 30° C. The reaction mixture was then refluxed on the steam bath for one hour. An additional portion of 4.5 grams of 37% formaldehyde was then added and refluxing continued for one hour. After the reaction mixture was cooled, a resin was separated and dissolved in acetone. This solution was evaporated to dryness under vacuum on a steam bath. Eighteen grams of a hard, black resin was obtained which melts at 100°-110° C.

Example 7

Eleven and one-half grams (0.05 mol) of TNT was suspended in 50 cc. of ethanol and 4.5 grams (0.05 mol) of 37% formaldehyde added. 1.85 grams (.0125 mol) of triethylene tetramine was then added while the temperature was maintained below 30° C. The reaction mixture was then refluxed on the steam bath for one hour. An additional 4.5 grams of 37% formaldehyde was added and refluxing continued for one hour. A resin formed and became very hard after the second portion of formaldehyde had been added. This made stirring impossible. After the reaction mixture had cooled, the resin was removed and a portion thereof dissolved in acetone. A considerable portion of high-melting material remained insoluble and was removed by filtration. The solution was then evaporated, leaving a hard, black resin which melts at 95°-100° C.

We claim:

1. The method of preparing a rapidly combustible resin which comprises reacting by condensing together 2,4,6-trinitrotoluene, formaldehyde, and a member of the group consisting of ammonia and primary, strongly basic, N-methylol-forming aliphatic and alicyclic amines.

2. The method of preparing a rapidly combustible resin which comprises reacting by condensing together 2,4,6-trinitrotoluene, formaldehyde, and ammonia.

3. The method of preparing a rapidly combustible resin which comprises reacting by condensing together 2,4,6-trinitrotoluene, formaldehyde, and a primary, strongly basic, N-methylol-forming aliphatic amine.

4. The method of preparing a rapidly combustible resin which comprises reacting by condensing together 2,4,6-trinitrotoluene, formaldehyde, and methylamine.

5. The method of preparing a rapidly combustible resin which comprises reacting by condensing together 2,4,6-trinitrotoluene, formaldehyde, and ethylene diamine.

6. As a new product, a resinous combustible condensation product of 2,4,6-trinitrotoluene, formaldehyde, and a member of the group consisting of ammonia and primary, strongly basic, N-methylol-forming, aliphatic and alicyclic amines.

7. As a new product, a resinous combustible condensation product of 2,4,6-trinitrotoluene, formaldehyde, and ammonia.

8. As a new product, a resinous combustible condensation product of 2,4,6-trinitrotoluene, formaldehyde, and a primary, strongly basic, N-methylol-forming aliphatic amine.

9. As a new product, a resinous combustible condensation product of 2,4,6-trinitrotoluene, formaldehyde, and methylamine.

10. As a new product, a resinous combustible condensation product of 2,4,6-trinitrotoluene, formaldehyde, and ethylene diamine.

HERMAN A. BRUSON.
GEORGE B. BUTLER.